United States Patent [19]

Hallewell

[11] 3,770,400
[45] Nov. 6, 1973

[54] METHOD OF MAKING GRINDING MEMBERS

[75] Inventor: Raymond Thomas Hallewell, Hillingdon Heath, Middlesex, England

[73] Assignee: Toolmasters Limited, Hillingdon Heath, Middlesex, England

[22] Filed: Jan. 6, 1969

[21] Appl. No.: 789,360

Related U.S. Application Data

[63] Continuation-in-part of Ser. No. 695,561, Jan. 4, 1968, Pat. No. 3,551,125.

[30] Foreign Application Priority Data

Jan. 4, 1968  Great Britain .......................... 717/68

[52] U.S. Cl. ......................... 51/295, 51/293, 51/298
[51] Int. Cl. .......................... B24b 53/06, B24d 5/00
[58] Field of Search ..................... 51/293, 295, 298, 51/307, 308, 309

[56] References Cited
UNITED STATES PATENTS 3,415,635  12/1968  Hallewell ............................ 51/298
3,424,566  1/1969  Kuenstle et al. ...................... 51/293

*Primary Examiner*—Donald J. Arnold
*Attorney*—Woodhams, Blanchard and Flynn

[57] ABSTRACT

A method of making a grinding member comprising a composition of a hardened resin and abrasive particles on a base, in which the resin in a kneadable condition is rolled on the base with a master roller to a predetermined profile and the resin is thereafter caused to harden slowly substantially without change of shape or volume, wherein there is included the improvement of initially filling the resin with a particulate substance imparting at least one of thermal and electrical conductivity, heat-, shock- and wear-resistance and ready wearability, of initially filling the resin with coarse abrasive particles and subsequently embedding fine abrasive particles in its exposed surface, and/or of bonding abrasive particles to the profiled surface by means of a hardenable resin the same as or compatible with that of the composition.

20 Claims, No Drawings

METHOD OF MAKING GRINDING MEMBERS

CROSS-REFERENCE TO RELATED APPLICATION

This application is a continuation-in-part of my co-pending application Ser. No. 695 561, filed Jan. 4, 1968, now U.S. Pat. No. 3 551 125.

This invention relates to the production of grinding members and is a modification or improvement of that described and claimed in British Patent Specification No. 1,044,784.

According to the present invention there is provided a method of making a grinding member having a profiled grinding surface comprising forming a body of a kneadable composition comprising a hardenable synthetic resin having a filler dispersed therethrough and having abrasive embedded in an exposed surface thereof, rolling the said exposed surface to the required predetermined profile with a master roller whilst the composition is still in a plastic state, and thereafter causing the body to harden with substantially no volume change.

The invention also provides a method of making a grinding member having a profiled grinding surface comprising forming a body of a kneadable composition comprising a hardenable synthetic resin having a filler dispersed therethrough, and, whilst the composition is still in a plastic state, embedding abrasive in an exposed surface of the body and rolling the said exposed surface to a predetermined profile with a master roller, the body thereafter being caused to harden with substantially no volume change. The abrasive may be applied superficially to the composition before or after rolling as a separate step, or simultaneously with rolling in a single operation.

For the production of a grinding wheel, a layer of the composition may be applied around the rim of a supporting disc and then treated as described above. The rim of the disc may be pre-formed to the required profile before the application of the composition, but is preferably flat and roughened, as by scoring or pitting, to provide a key for the kneadable composition.

Due to the workable nature of the plastic composition, the method of the invention does not require the application of high pressure for the profiling or impregnation, so that power consumption is relatively low, there is little or no wastage of abrasive, and there is no limitation as to the width of the discs that can be treated. The invention thus provides a method whereby cheaper and more accurately profiled grinding members with a wider range of possible profiles can be produced than has been possible heretofore. In the production of grinding wheels the method of the invention has the additional advantage that it can be operated without affecting the true running of the finished wheel; the wheel can be mounted, trued up, and then profiled and impregnated in position and ready for use.

The abrasive and filler employed will normally be different materials, but the abrasive may in some cases also be the filler or dispersed through the composition with a different filler.

The filler imparts bulk to the composition, aids in the production of the required kneadable consistency for rolling, and imparts strength and rigidity to the hardened product. Any one or more of a wide variety of fillers may be employed according to the physical properties required of the product.

Various comminuted metals can for example be employed as fillers. Hard metals such as steel give a product which retains its accuracy of profile over long periods, whereas softer metals such as copper or aluminium have the advantage of wearing in use to continually expose fresh abrasive; these softer metals, giving a soft wearing bond, are employed for fine work or for fast removal of stock without risk of damage to the work.

The following Table illustrates properties typically required of grinding wheels for particular purposes together with examples of appropriate fillers for use in the method according to the invention.

| Characteristic of hardened composition | Advantage or suited use of grinding member | Examples of appropriate fillers |
| --- | --- | --- |
| Soft wearing bond | (a) for fine work. (b) for fast stock removal without damage to work. | Soft metals such as copper or aluminium; soft nonmetals such as wood flour, chalk powder, marble flour. |
| Hard wearing bond | minimum wheel wear | slate powder; silica flour; hard metals such as steels. |
| Very hard, abrasive-wear resisting bond | minimum wheel wear | aluminium oxide, silicon carbide. |
| Shock resistance | where high resilience is required in hard working wheels. | nylon; asbestos powder. |
| Electrical conductivity | for electrolytic grinding | electrically conductive metals such as copper and aluminium; electrically conductive nonmetals such as graphite; nonmetals and plastics materials coated with electrically conductive metal. |
| Thermal conductivity | minimum damage to work through local overheating during grinding. | thermally conductive metals such as copper or aluminium. |
| Heat-resistant bond | minimum damage to wheel due to local overheating during grinding. | heat-resistant materials such as mica or asbestos powder. |

The fillers mentioned above can be used alone, but where a combination of properties is required of the finishing grinding member a mixture of different fillers may be employed. The particular filler or fillers used, and the proportion or proportions thereof employed, is selected according to the use to which the grinding member is to be put.

Where a comminuted metal or mixture of metals is employed alone as the filler, the metallic component will normally constitute a major proportion by weight of the kneadable composition, but where a mixture of metal with another filler (e.g., an abrasive such as diamond, alumina or silicon carbide, or a filler imparting shock-or heat-resistance) is employed, the metallic component may constitute only a minor proportion by weight of the composition.

As indicated above the total proportion of filler employed in the composition may vary over a wide range according to the intended purpose of the product. In general however, the volume proportions will range from 60 percent filler, 40 percent resin where no abrasive is included to 60 percent resin, 40 percent filler where abrasive is present.

The identity, amount, and grain size of the abrasive applied to the exposed surface of the grinding wheel will also be chosen according to the intended use of the finished grinding member, as is well understood in the art. For example diamond used as the applied abrasive will normally be of from 80 to 200 grit size, the finer particles being used for accurate work and the coarser for rough grinding.

The kneadable composition may include abrasive particles as or in addition to the filler. If this abrasive is relatively coarse, and abrasive of finer grit size is applied superficially to the composition, a grinding member is obtained which initially (when the profile is most accurate) is suited for finish grinding; as the profile wears the coarser abrasive is exposed and the member can then be used for rough grinding.

In one embodiment of the method according to the invention the exposed surface of the composition is first rolled to the required profile and then has applied thereover an unfilled liquid resin adhesive which is the same as or compatible with the resin of the base composition; the abrasive particles are then applied to the adhesive which holds them until they are rolled in. The composition and resin adhesive are then hardened together to give a unified product. The use of adhesive in this manner ensures that the individual abrasive grains are intimately surrounded by hardened resin. Alternatively the resin adhesive and abrasive may be applied together, e.g., by spraying. In these embodiments the superficially applied abrasive may be of finer grain size than a coarser abrasive dispersed through the composition as described above.

Where a comminuted metal is employed as filler for the resin it will normally constitute a major proportion by weight of the kneadable composition, but this is not essential, especially where other fillers are also incorporated.

For superficial application, the abrasive particles may be simply sprinkled onto the surface of the composition, but are preferably sprayed on, e.g., in an air jet. In the production of a grinding wheel the abrasive may for example be sprayed onto the peripheral layer from a spray head which, for application during or after profiling, is most advantageously mounted in place of the usual forming tool on a standard wheel-forming apparatus such as the Diaform equipment described in British Patent Specification No. 573,877.

The advantage of mounting the spray jet on a Diaform is that the jet is kept at a constant distance from the face of the wheel; this is important, as any variation in this distance will vary the concentration of the abrasive applied, due to spread as the abrasive leaves the jet.

With the spray method using a predetermined pressure and distance, the penetration and concentration of abrasive applied to the wheel can be controlled; in the case of simultaneous impregnation and profiling the penetration need only be deep enough to key the abrasive, as it will be immediately rolled into position.

Simultaneous forming and impregnation with abrasive is advantageous, because the optimum consistency of the hardening composition for both the rolling and the impregnation steps is the same; if application of abrasive is delayed until the composition has hardened further, the abrasive may be loosely bonded and more likely to out of the wheel during grinding.

The plastic composition should be of such consistency for the profiling and impregnating step that it does not stick to the roller. The resin and hardening agent used in the composition are therefore preferably so selected that the prepared composition retains its workable consistency for an extended period, e.g., for an hour or more.

To obtain the optimum workable consistency it may be necessary to include a thickening agent, such as silica, in the composition. Polymerisable epoxy or polyester resins, in admixture with a hardening agent e.g., one comprising a polyamide and a mild base such as an amine, are suitable for use as the resinous component of the composition and as the liquid resin adhesive where one is used. Acrylic resins with appropriate hardening agents are also suitable for these purposes.

As indicated above abrasive particles may be employed as the filler, or as part of the filler, and this permits wheels to be produced having layers with abrasives of different grain size. For example the kneadable composition may be wholly or partially filled with abrasive of relatively coarse grain size, a finer abrasive (which may be the same as or different from the coarse abrasive) being applied superficially during profiling. Initially, when the form of this wheel is most accurate, fine grit is exposed and the wheel can hence be used for finish grinding; as the form wears, coarse abrasive is exposed rendering the wheel more suited for rough grinding.

Embodiments of the invention are illustrated by the following specific examples.

EXAMPLE 1

A metal disc of about 6 inches diameter, about 1 inch thick and having a roughened rim is mounted on the spindle of a grinding machine. A thin layer of Devcon "A" (Trade Mark) a resinous composition including 80 percent by weight comminuted steel and 20 percent by weight curable epoxy resin, is applied around the rim of the disc and allowed to partially harden. The required form is then rolled into the peripheral layer of Devcon "A" by means of a master roller, whilst diamond dust is sprayed onto the layer immediately ahead of the roller from a spray head mounted in place of the forming tool on a wheel-forming apparatus. The profiled and impregnated layer of Devcon "A" is then allowed to set to its final hardness. The Devcon "A" sets to a hard mass with substantially no shrinkage, so that a hard-wearing abrasive surface of accurate profile is obtained.

EXAMPLE 2

The procedure of Example 1 was repeated using Devcon "F" instead of Devcon "A." Devcon "F" includes 80 percent by weight of comminuted aluminium as filler. A soft-wearing thermally-conductive wheel of accurate profile was obtained.

EXAMPLE 3

The procedure of Example 1 was repeated using as the kneadable composition a curable epoxy resin containing 80 wt. percent of copper as filler. An electrically conductive wheel of accurate profile, suitable for electrolytic grinding was obtained.

EXAMPLE 4

The procedure of Example 1 was repeated employing a kneadable composition containing 15 wt. percent epoxy resin, 40 wt. percent comminuted aluminium and 45 wt. percent 80 grit size diamond dust, the diamond dust applied superficially being of 200 grit size. The wheel obtained was a relatively soft-wearing thermally conductive wheel having an accurate profile with fine abrasive exposed. The wheel is initially suited for fine work, but as it wears coarser abrasive is exposed for rough grinding with fast stock removal.

EXAMPLE 5

The procedure of Example 1 was repeated using a composition in which 40 wt. percent of the steel was replaced by granulated nylon, a hard-wearing shock-resistant wheel being obtained.

EXAMPLE 6

The procedure of Example 1 was repeated using a kneadable composition of a curable polyester resin containing as filler 60 percent by volume of a 50/50 mixture of wood flour and marble flour, a very soft-wearing wheel for fast stock removal being obtained.

EXAMPLE 7

The procedure of Example 1 was repeated using a kneadable composition of a curable polyester resin containing as filler 30 percent by volume of asbestos powder and 30 percent by volume of silicon carbide, the wheel obtained being very hard, wear-resistant, shock-resistant and heat-resistant.

EXAMPLE 8

A wheel for electrolytic grinding was produced by repeating the procedure of Example 3 using as filler 55 percent by volume of graphite powder in place of the copper.

EXAMPLE 9

A steel disc of the dimensions specified in Example 1 is mounted on the spindle of a grinding machine, and a layer of the kneadable composition used in Example 4 is applied around its roughened rim and then rolled to the required profile with a master roller. A thin coating of the curable epoxy resin, without a filler and in liquid form, is applied over the profiled surface, and diamond dust of 200 grit size is dusted uniformly over this adhesive layer and is rolled in with the same master roller after permitting the adhesive to set partially. The composition and resin adhesive then set together to their final hardness to yield an integral wheel initially suited for fine work but which wears in use to expose coarser abrasive for rough grinding. The procedure of this Example is equally applicable to the compositions employed in Example 1 to 3 and 5 to 8.

EXAMPLE 10

The procedure of Example 9 was repeated employing a kneadable composition containing 50 percent by volume of curable epoxy resin and 50 percent by volume of a 60/40 mixture of slate powder and silica flour. A hard-wearing wheel with firmly bonded abrasive was obtained.

EXAMPLE 11

The procedure of Example 10 was repeated except that no layer of liquid resin adhesive was employed, the diamond dust being applied directly to the profiled surface and then rolled in. A hard-wearing wheel, but with the abrasive somewhat less firmly bonded, was obtained.

EXAMPLE 12

The procedure of Example 11 was repeated using the kneadable composition specified in Example 6, a soft-wearing wheel being obtained.

EXAMPLE 13

Example 4 was repeated except that the kneadable composition was profiled without the superficial application of fine abrasive. A thermally conductive soft-wearing wheel was obtained suitable for rapid rough grinding.

EXAMPLE 14

The procedure of Examples 11 and 12 was repeated employing the kneadable compositions used in Examples 1–3, 5, and 7–10.

What is claimed is:

1. In a method of making a grinding member having abrasive particles embedded in a substrate, said substrate comprising a filled resin consisting essentially of a synthetic resin containing a hardener for curing said resin without application of heat, said resin having particulate inert filler dispersed therethrough, the improvement which comprises the steps of:

1. placing a continuous layer of said filled resin on a base, 2. while the filled resin is supported on the base and is in a partially hardened condition in which it is capable of being permanently deformed upon application of pressure thereto and is nonsticky, molding the resin layer to alter the shape of said resin layer by moving a rotating shaping roller over an exposed surface of the resin layer and applying a deforming pressure onto said surface of said resin layer by means of the roller and thereby altering the shape of said resin layer until said exposed surface thereof has been deformed to a final profile, 3. applying to said profiled surface abrasive particles and a liquid adhesive resin which adheres to said filled resin and said abrasive particles, 4. causing the filled resin and the adhesive resin to harden slowly without changing the shape of the surface and with substantially no volume change to form a grinding member having a grinding surface of said final profile and to unite the filled resin layer to the base and to the abrasive particles.

2. A method as defined in claim 1 wherein said adhesive resin and abrasive particles are applied to said profiled surface in admixture.

3. A method as defined in claim 1 wherein said liquid adhesive resin is applied alone over said profiled surface and said abrasive particles are thereafter embedded in said adhesive resin coating.

4. A method as defined in claim 1 wherein said adhesive resin is the same as said resin of said layer.

5. A method as defined in claim 1 wherein said filler comprises coarse abrasive particles and wherein said abrasive particles subsequently applied to said profiled surface are fine abrasive particles.

6. A method as defined in claim 1 wherein said filler imparts to said resin layer at least one of the properties of thermal conductivity, electrical conductivity, heat resistance, shock resistance and wear resistance.

7. A method as defined in claim 1 wherein said filler is selected from the group consisting of wood flour, chalk powder, marble flour, slate powder, silica flour, aluminum oxide, silicon carbide, diamond dust, nylon, asbestos powder, mica powder, graphite, comminuted metals, metal-coated particles, and mixtures thereof.

8. A method as defined in claim 1, wherein the base comprises a central supporting disc and the continuous resin layer is of an annular configuration disposed around the rim of the disc with the exposed surface of the layer constituting the peripheral surface of the annular layer.

9. A method as defined in claim 1, wherein the base comprises a central supporting disc and the continuous resin layer is of an annular configuration disposed around the rim of the disc, and wherein the exposed surface of the layer is rolled to said final profile while said disk is mounted in its operable grinding position, whereby the grinding member is produced already mounted and trued up in position ready for use.

10. A method of making a grinding member having abrasive particles embedded in a synthetic resin substrate, the method comprising the steps of:

1. providing a hardenable synthetic resin containing a hardene for curing said resin without application of heat,
2. mixing said resin with coarse abrasive particles so that said coarse abrasive particles become dispersed in said resin,
3. placing a continuous layer of said resin/abrasive mixture on a base,
4. while the resin is supported on the base and is in a partially hardened condition in which it is capable of being permanently deformed upon application of pressure thereto and is nonsticky, a. molding the resin layer to alter the shape of said resin layer by moving a rotating shaping roller over an exposed surface of the resin layer and applying a deforming pressure onto said surface of said resin layer by means of the roller and thereby altering the shape of said resin layer until it has been deformed to a final profile,
   b. applying fine abrasive particles to said exposed surface of said layer,
5. causing the resin to harden slowly without changing the shape of the surface and with substantially no volume change to form a grinding member having a grinding surface of said final profile and to unite the resin layer to the base and to the fine abrasive particles.

11. A method as defined in claim 10 wherein said fine abrasive particles are embedded in said exposed surface after it has been deformed to said final profile.

12. In a method of making a grinding member having abrasive particles embedded in a synthetic resin substrate, the improvement which comprises the steps of;

1. providing a hardenable synthetic resin containing a hardener for curing said resin without application of heat,
2. dispersing particles of inert filler material in said resin,
3. placing a continuous layer of said filled resin on a base,
4. while the filled resin is supported on the base and is in a partially hardened condition in which it is capable of being permanently deformed upon application of pressure thereto and is nonsticky, molding the resin layer to alter the shape of said resin layer by moving a rotating shaping roller over an exposed surface of the resin layer and applying a deforming pressure onto said surface of said resin layer by means of the roller and thereby altering the shape of said resin layer until said exposed surface thereof has been deformed to a final profile,
5. causing the resin to harden slowly without changing the shape of the surface and with substantially no volume change to form a grinding member having a grinding surface of said final profile and to unite the resin to the base, said filler material comprising at least one substance imparting to said hardened resin layer at least one of the properties of thermal conductivity, electrical conductivity, heat resistance, shock resistance, wear resistance and ready wearability.

13. A method as defined in claim 12 wherein the filler material is selected from the group consisting of wood flour, chalk powder, marble flour, slate powder, silica flour, aluminium oxide, silicon carbide, diamond dust, nylon, asbestos powder, mica powder, graphite, comminuted metals, metal-coated particles, and mixtures thereof.

14. A method as defined in claim 12, wherein the base comprises a central supporting disc and the continuous resin layer is of an annular configuration disposed around the rim of the disc with the exposed surface of the layer constituting the peripheral surface of the annular layer.

15. A method as defined in claim 12, wherein the base comprises a central supporting disc and the continuous resin layer is of an annular configuration disposed around the rim of the disc, and wherein the exposed surface of the layer is rolled to said final profile while said disc is mounted in its operable grinding position, whereby the grinding member is produced already mounted and trued up in position ready for use.

16. A method as defined in claim 10 wherein the base comprises a central supporting disc and the continuous resin layer is of an annular configuration disposed around the rim of the disc with the exposed surface of the layer constituting the peripheral surface of the annular layer.

17. A method as defined in claim 10, wherein the base comprises a central supporting disc and the continuous resin layer is of an annular configuration disposed around the rim of the disc, and wherein the exposed surface of the layer is rolled to said final profile while said disc is mounted in its operable grinding position, whereby the grinding member is produced already mounted and trued up in position ready for use.

18. A method as defined in claim 1 wherein said abrasive particles are sprayed onto said profiled surface.

19. A method as defined in claim 10 wherein the said fine abrasive particles are sprayed onto said exposed surface after it has been profiled.

20. A method as defined in claim 12 wherein abrasive particles are sprayed onto said exposed surface of said resin layer after profiling but before the resin layer has hardened.

* * * * *